United States Patent
Korthals

(10) Patent No.: US 7,430,861 B2
(45) Date of Patent: Oct. 7, 2008

(54) SHIFT CONTROLLED BYPASS ORIFICE FOR HYDROSTATIC TRANSMISSION

(75) Inventor: Douglas Dean Korthals, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 114 days.

(21) Appl. No.: 11/509,377

(22) Filed: Aug. 24, 2006

(65) Prior Publication Data

US 2008/0047264 A1   Feb. 28, 2008

(51) Int. Cl.
*F16H 61/40* (2006.01)
*F04B 23/00* (2006.01)

(52) U.S. Cl. .......................... 60/468; 60/464
(58) Field of Classification Search .............. 60/468, 60/487, 464
See application file for complete search history.

(56) References Cited

U.S. PATENT DOCUMENTS

| 4,843,817 | A | 7/1989 | Shivvers et al. | 60/487 |
| 4,896,506 | A * | 1/1990 | Shivvers et al. | 60/487 |
| 6,253,637 | B1 | 7/2001 | Hauser et al. | 74/531 |
| 6,513,325 | B2 * | 2/2003 | Shimizu et al. | 60/487 |
| 6,672,843 | B1 * | 1/2004 | Holder et al. | 60/486 |
| 6,782,699 | B2 * | 8/2004 | Thoma et al. | 60/487 |
| 6,837,047 | B2 * | 1/2005 | Dong et al. | 60/464 |
| 7,051,840 | B2 * | 5/2006 | Tani | 184/6.12 |
| 7,082,759 | B1 * | 8/2006 | Tsukamoto et al. | 60/484 |

* cited by examiner

*Primary Examiner*—Thomas E Lazo

(57) ABSTRACT

A shift controlled bypass orifice for a hydrostatic transmission includes a pump valve body with high pressure ports through which hydraulic fluid flows between a pump and a motor, a bypass orifice extending between the high pressure ports and the outside of the pump valve body, a bleed poppet movable between a closed position blocking the bypass orifice and an open position opening the bypass orifice, and a poppet push pin moving the bleed poppet toward the open position if the hydrostatic transmission is in neutral, and toward the closed position if the hydrostatic transmission is in forward or reverse.

16 Claims, 5 Drawing Sheets

SHIFT CONTROLLED BYPASS ORIFICE FOR HYDROSTATIC TRANSMISSION

FIELD OF THE INVENTION

The invention relates to hydrostatic transmissions for work vehicles, and particularly to hydrostatic transmissions used on grass mowing machines having a hydrostatic transmission to control the direction of rotation and speed of traction drive wheels.

BACKGROUND OF THE INVENTION

Hydrostatic transmissions for work vehicles such as grass mowing machines may be used to control direction and speed of traction drive wheels. To shift between neutral and forward or reverse, the vehicle operator may move operator controls to turn a trunion shaft or control arm on the hydrostatic transmission. Turning the trunion shaft or control arm also will change the rotational speed of the wheel. When shifting the hydrostatic transmission from neutral into forward or reverse, such vehicles have a tendency to be somewhat jerky or bouncy, as the operator may not be able to smoothly control the transition from neutral. Additionally, the vehicle may experience dynamic braking, which may result in turf damage due to tire slippage and scuffing.

Hydrostatic transmissions may include a pump with a bleed passage or bypass orifice in the closed loop section of the hydraulic circuit. The bypass orifice may be included in the hydraulic circuit to help soften the abrupt transition between neutral and forward or reverse by broadening the neutral zone of the hydrostatic transmission. The bypass orifice also can provide a softer application of dynamic braking, which may reduce turf damage and enhance the vehicle's overall control, especially when mowing on a slope or hillside.

During assembly of a work vehicle with a hydrostatic transmission, a bypass orifice can help adjust and index the neutral position of the operator controls to the hydrostatic pump's exact hydraulic neutral. Hydrostatic transmissions with very small and/or no closed loop bleed passage or bypass orifice exhibit a very tight neutral or no-flow position zone. In contrast, hydrostatic transmissions equipped with larger bleed orifices have a large neutral zone, and are much easier to adjust to a no-creep position.

However, bypass orifices may have disadvantages. For example, bypass orifices may contribute to increased temperatures as loop pressures increase. Accordingly, a bypass orifice for a hydrostatic transmission is needed that provides a neutral zone sufficient to provide a smooth transition between neutral and forward or reverse, without increasing temperatures. A bypass orifice is needed that will help increase pump performance, and simplify assembly.

SUMMARY OF THE INVENTION

A shift controlled bypass orifice is provided for a hydrostatic transmission of a work vehicle such as a grass mowing machine. A charge pump provides hydraulic fluid to a plurality of high pressure ports, each high pressure port having a charge system bypass valve. The shift controlled bypass orifice connects to each charge system bypass valve. A poppet closes the bypass orifice in response to operator controls shifting the hydrostatic transmission to a non-neutral position. A trunion shaft cams the poppet to close the bypass orifice in response to movement of operator controls to the non-neutral position, and opens as the operator moves the controls closer to neutral.

DESCRIPTION OF THE PREFERRED EMBODIMENT

Figure 1:
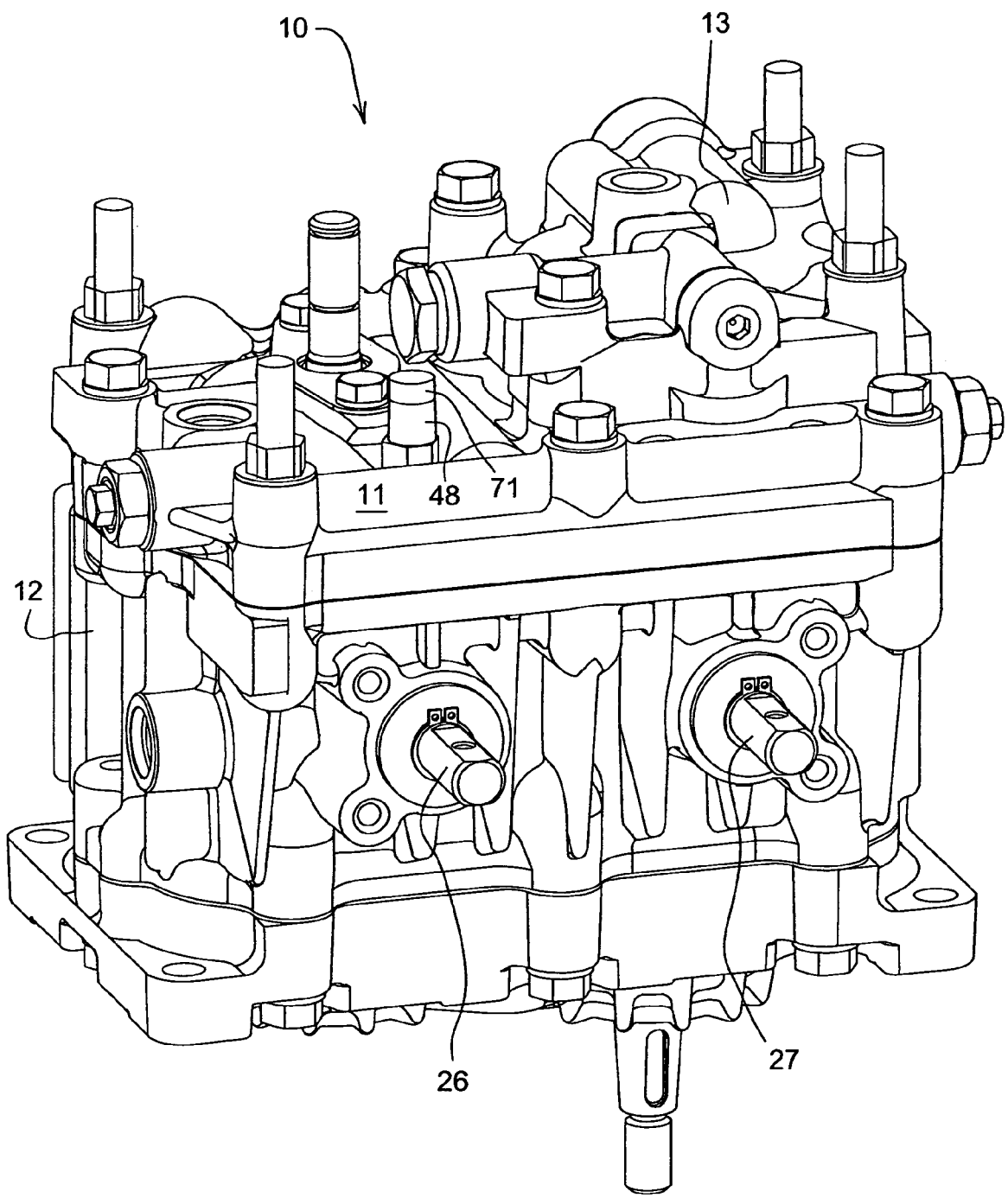
FIG. 1 is a perspective view, partially in section, of a hydrostatic transmission with a shift controlled bypass orifice according to a first embodiment of the invention.
Figure 2:
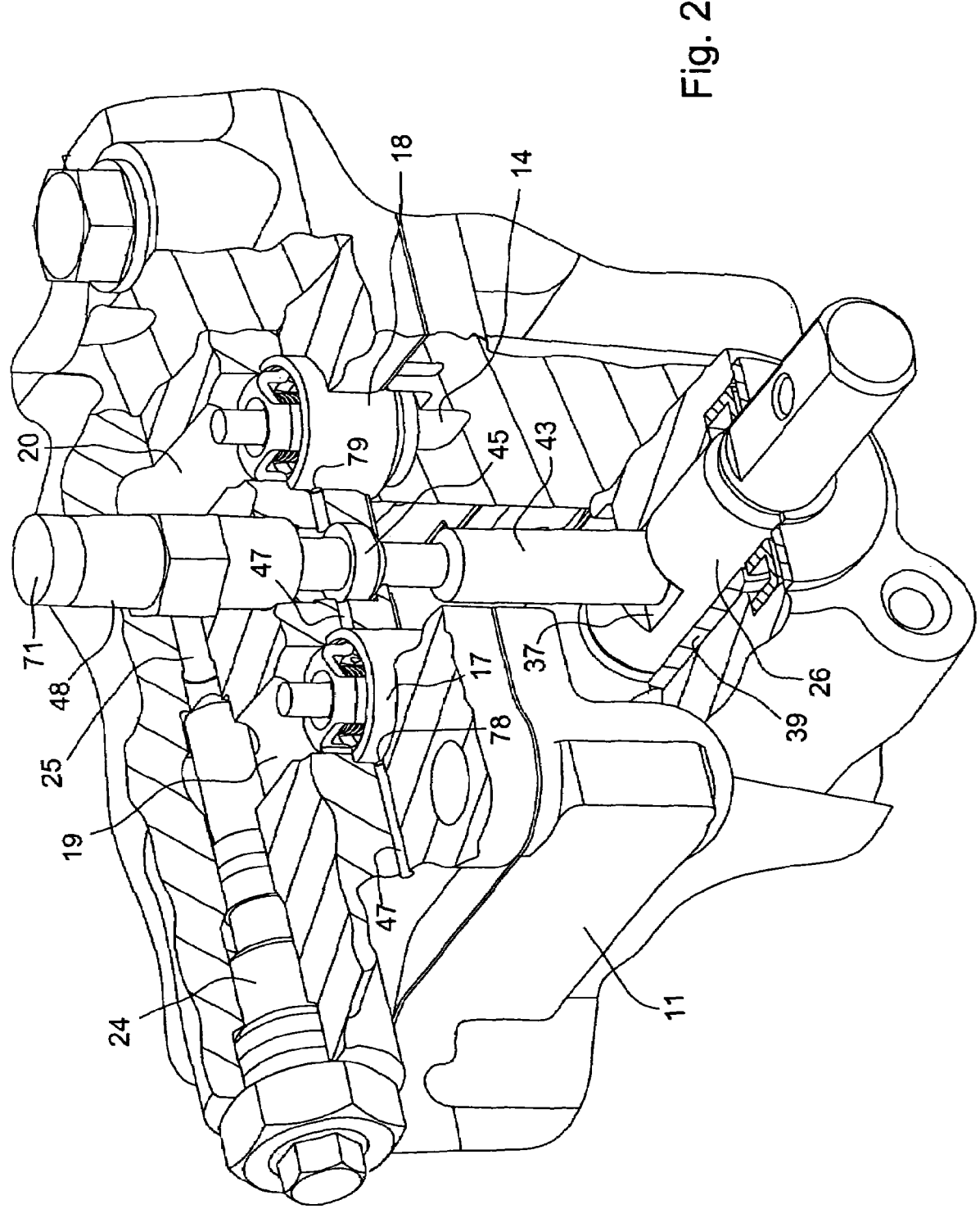
FIG. 2 is a perspective view, partially in section, of a pump valve body with a shift controlled bypass orifice according to a first embodiment.
Figure 3:
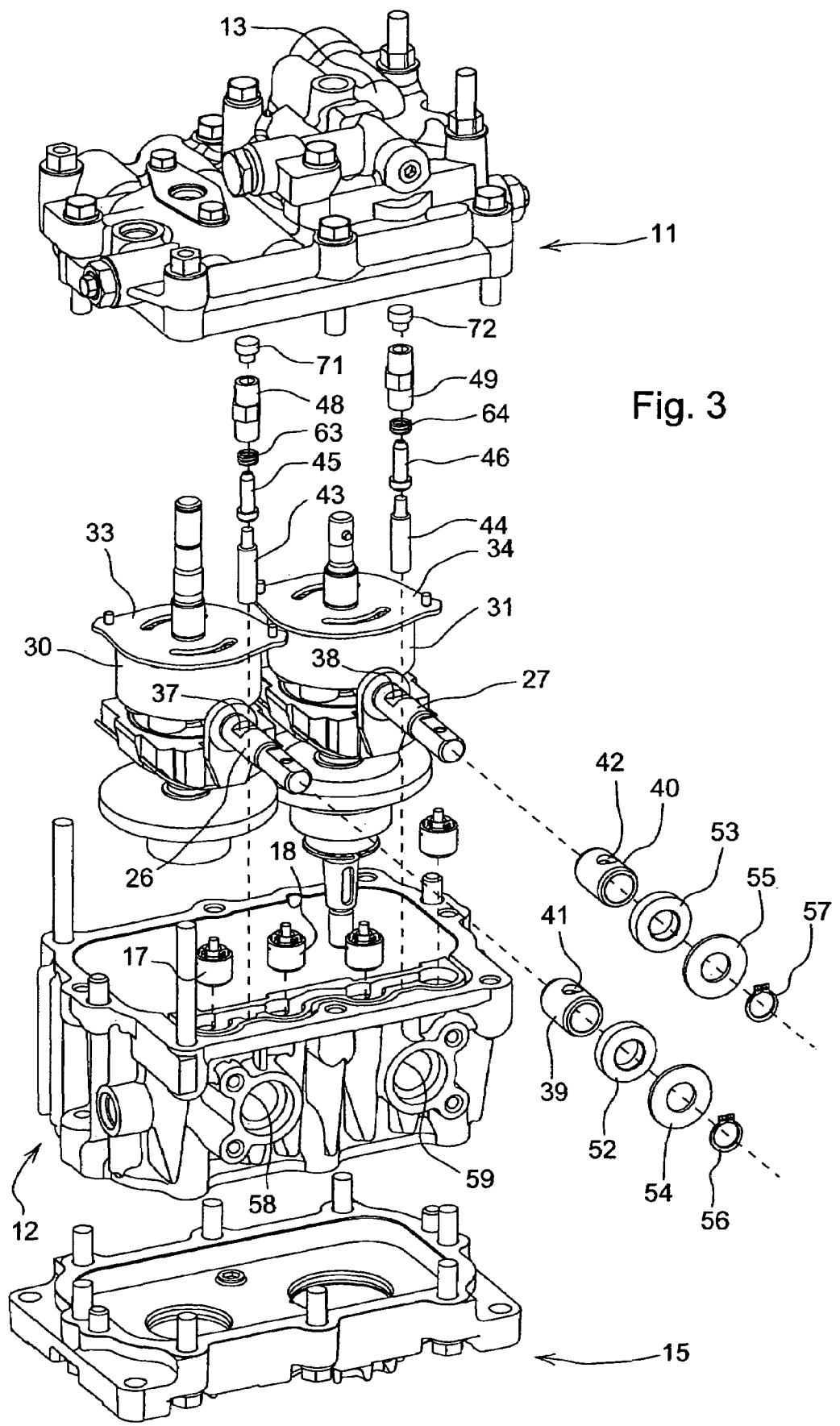
FIG. 3 is an exploded perspective view of a hydrostatic transmission with a shift controlled bypass orifice according to a first embodiment.

FIGS. 1-5 show an embodiment of the shift controlled bypass orifice in hydrostatic transmission 10. The hydrostatic transmission includes dual pump valve body 11, main housing 12, charge pump 13, and lower housing 15. The shift controlled bypass orifice also may be included in a hydrostatic transmission having a single pump valve body. Charge pump 13 may be a rotary pump operatively connected to a rotating shaft of an internal combustion engine, electric motor or other power source, and may supply hydraulic fluid to charge port 14. The pump valve body also may include a pair of valve plates 33, 34.

In one embodiment, charge system bypass valves 17, 18 may open to allow hydraulic fluid in charge port 14 to enter and maintain sufficient hydraulic fluid pressure in high pressure ports 19, 20. Each charge system bypass valve may include a check ball that is spring biased to a closed position. Each charge system bypass valve may open if hydraulic fluid pressure in charge port 14 exceeds the hydraulic pressure in high pressure ports 19, 20 sufficiently to overcome the spring force and unseat the check ball.

In one embodiment, hydraulic lines may connect high pressure ports 19, 20 to a hydraulic motor which rotates a traction drive wheel to move the vehicle forward or in reverse. If it is necessary to rotate the traction drive wheel without operating the hydrostatic transmission, bypass valve 24 may be retracted from crossover passage 25, allowing hydraulic fluid to circulate freely between high pressure ports 19 and 20.

In one embodiment, trunion shafts or control arms 26, 27 may extend through main housing 12, and may turn to pivot swash plates. The trunion shafts or control arms 26, 27 may be turned using various operator controls, such as pivoting sticks that are commonly used to operate zero turning radius mowers. The operator controls may be used to turn the trunion shafts to shift between neutral and forward or reverse, and change the speed in forward or reverse, by changing the angle of the swash plate. Each swash plate controls the position and displacement of pistons in a piston cylinder block 30, 31, to specify the direction and flow of hydraulic fluid from high pressure ports 19, 20 through hydraulic lines to a hydraulic motor.

In one embodiment, each trunion shaft or control arm 26, 27 may be a generally cylindrical shaft having a groove 37, 38. Each trunion shaft or control arm may be inserted through bushing 39, 40, oil seal 52, 53, washer 54, 55 and lock ring 56, 57 positioned in openings 58, 59 in main housing 12. Each bushing may have an aperture 41, 42 though which poppet push pin 43, 44 may extend to ride on and be directly activated off the trunion shaft or control arm.

In one embodiment, each poppet push pin 43, 44 may activate spring biased bleed poppet 45, 46 to slide into poppet cap 48, 49, opening or closing shift controlled bypass orifice 47. Each poppet cap 48, 49 may protrude through the top of the pump valve body. Springs 63, 64 may be positioned between each bleed poppet and poppet cap to maintain contact between the bleed poppet, poppet push pin, and trunion shaft. The top of each poppet cap may be closed by plug 71, 72.

In one embodiment, the shift controlled bypass orifice may extend from the charge system bypass valves to the outer wall of the pump valve body where it may be connected to a conduit to hydraulic fluid reservoir. As the operator shifts a control between neutral and either forward or reverse, the control turns the trunion shaft, and poppet push pin 43, 44 pushes bleed poppet 45, 46 up to close the shift controlled bypass orifice, or down to open the shift controlled bypass orifice. The shift controlled bypass orifice also may include an aperture 49, 50 through the holder wall of each charge system bypass valve 17, 18.

Figure 4:
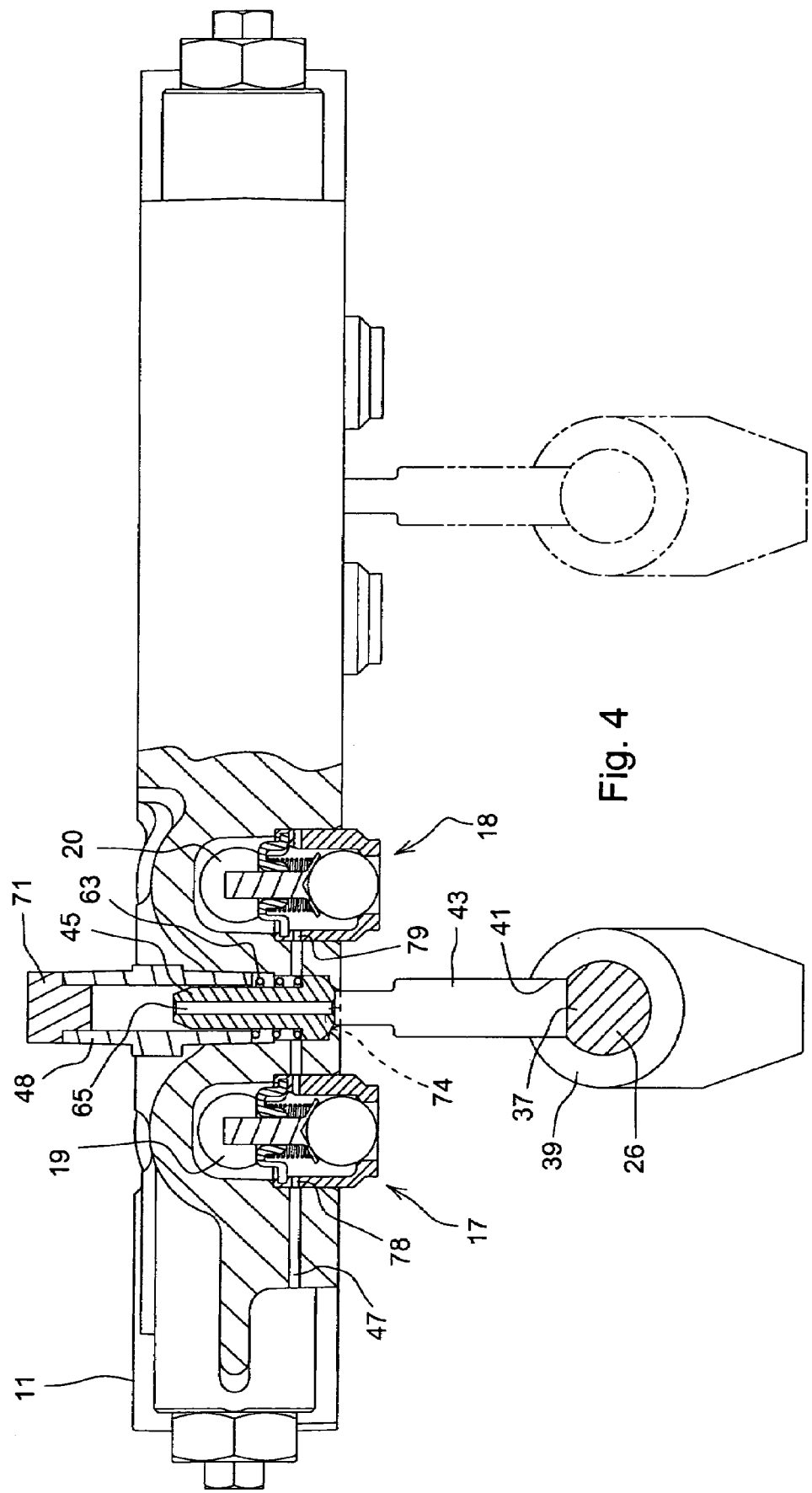
FIG. 4 is a cross section view of a pump valve body with a shift controlled bypass orifice in the open position according to a first embodiment.

In FIG. 4, trunion shaft 26 is shown in a neutral position. Shift controlled bypass orifice 47 is open because bleed poppet 45 has moved down as poppet push pin 43 rides down into groove 37 in trunion shaft 26. As the poppet push pin cams downward, bleed poppet 45 slides down and further out from poppet cap 48 to open the shift controlled bypass orifice.

Figure 5:
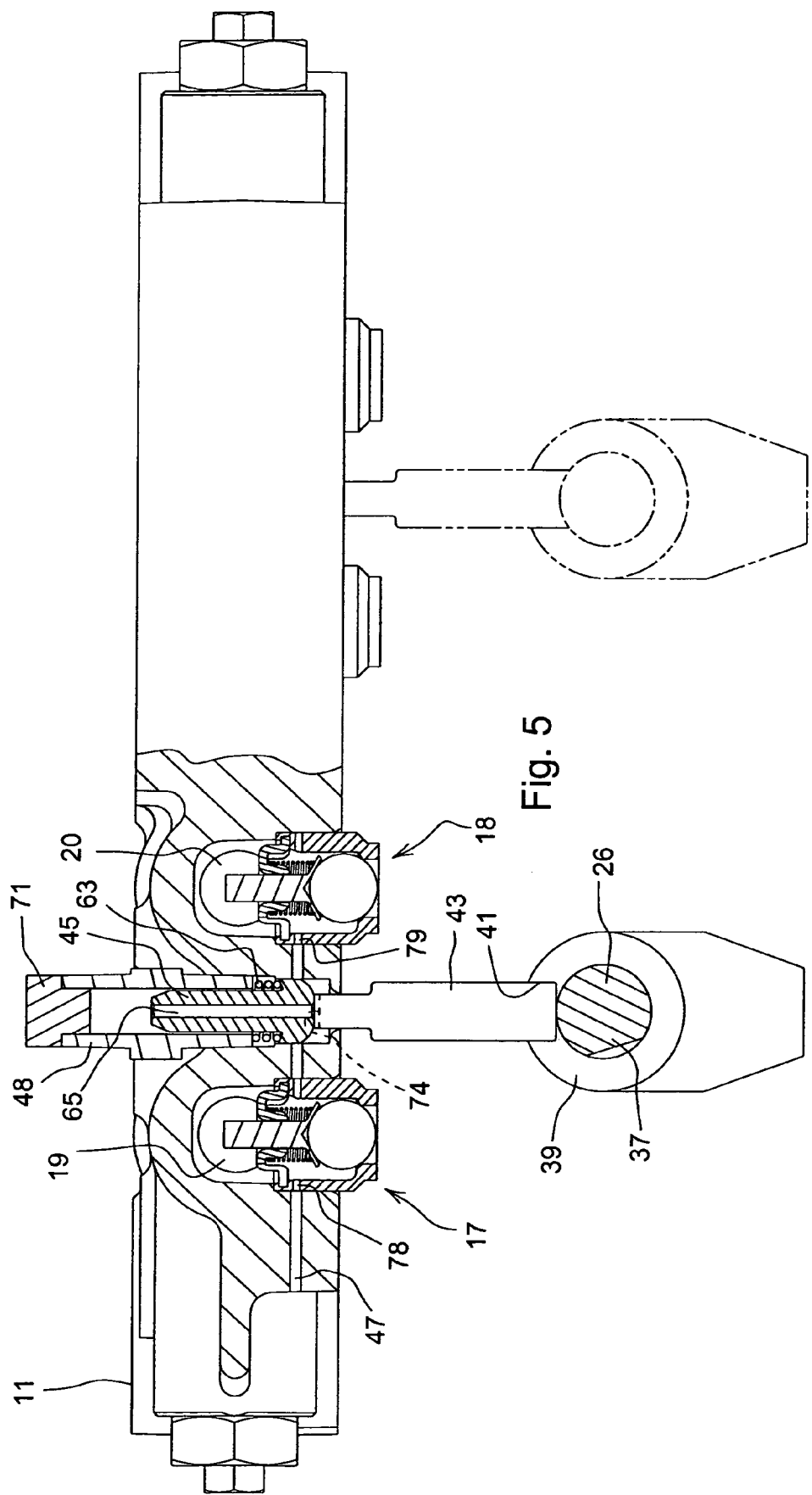
FIG. 5 is a cross section view of a pump valve body with a shift controlled bypass orifice in the closed position according to a first embodiment.

In FIG. 5, trunion shaft 26 is shown in a forward or reverse position. Shift controlled bypass orifice 47 is closed because bleed poppet 45 has been pushed up by poppet push pin 43 riding on the outer diameter of trunion shaft 26. The poppet push pin cams upward, urging bleed poppet 45 to slide up further into poppet cap 48, to close the shift controlled bypass orifice.

In one embodiment, each trunion shaft may turn about twenty degrees between a neutral position and a maximum forward position, and about twenty degrees from neutral to maximum reverse. Groove 37 on the trunion shaft may be dimensioned so that the shift controlled bypass orifice is completely open for about ten percent of the trunion shaft's total range of rotation between neutral and forward, and between neutral and reverse. This means the groove is dimensioned so that the shift controlled bypass orifice is completely open, most preferably about two degrees, or in a range of between about one degree and about three degrees, of trunion shaft rotation on each side of the neutral position.

In one embodiment, bleed orifice 65 may extend through bleed poppet 45. Hydraulic fluid flowing through the open shift controlled bypass may flow between the bleed poppet and poppet cap, through bleed orifice 65, and out around the top of poppet push pin 43 into the case. The top surface of poppet push pin 43 may have a groove 74 so that hydraulic fluid is not trapped in bleed orifice 65.

In one embodiment, shift controlled bypass orifice 47 may have an internal diameter equal to or greater than bleed orifice 65 through the bleed poppet. For example, bleed orifice 65 may have an internal diameter of between about 0.010 inches and about 0.045 inches, and shift controlled bypass orifice may have an internal diameter that is the same or equal.

In one embodiment, as trunion shaft 26 pushes the poppet push pin 43 up and against bleed poppet 45, the bleed poppet progressively closes off shift controlled bypass orifice 47. At some degree of trunion shaft rotation, bleed poppet 45 completely shuts off all bypass fluid flow through the shift controlled bypass orifice. The closer an operator control is to neutral, the more the bleed poppet opens the bypass orifice.

The shift controlled bypass orifice may sequentially widen the neutral zone and allow for enhanced dynamic braking and vehicle control. As a result, the shift controlled bypass orifice effectively increases the hydraulic pump's performance, and also eliminates induced heat.

The shift controlled bypass orifice of the present invention has a number of benefits and advantages, as set forth below. The shift controlled bypass orifice helps improve operator comfort and machine control by significantly reducing abrupt, jerky starts. The shift controlled bypass orifice helps achieve better control of a vehicle such as a grass mowing machine during turns and stops by providing softer dynamic braking. The shift controlled bypass orifice improves performance of a hydrostatic transmission as the vehicle approaches normal operating speeds because, as the bypass bleed is shut down, more of the closed loop fluid is directed to the wheel motors. The shift controlled bypass orifice helps increase the life of a hydrostatic transmission, and enhance vehicle performance and reliability, by reducing system operating temperatures. The shift controlled bypass orifice enhances vehicle safety by reducing or eliminating hard starts, reducing front end lift off, and effectively reducing creep in the neutral position while the engine is running. The shift controlled bypass orifice improves system reliability because hard start pressures are less spiked, reducing undesirable and adverse stresses on all system components. The shift controlled bypass orifice also can reduce vehicle maintenance requirements because the wider neutral zone of the hydrostatic transmission requires fewer and less frequent creep adjustments. The shift controlled bypass orifice helps reduce assembly time because locating and adjusting hydraulic neutral creep is much easier to attain. The shift controlled bypass orifice locates all controls and components inside a hydrostatic pump, and are less subject to damage or contamination than external components.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A shift controlled bypass orifice for a hydrostatic transmission, comprising:
   a pump valve body having a plurality of high pressure ports through which hydraulic fluid flows between a pump and a motor;
   a bypass orifice in the pump valve body and extending between the high pressure ports and the pump valve body;
   a bleed poppet movable between a closed position blocking the bypass orifice and an open position opening the bypass orifice;
   a poppet push pin moving the bleed poppet toward the open position if the hydrostatic transmission is in neutral, and toward the closed position if the hydrostatic transmission is in forward or reverse.

2. The shift controlled bypass orifice of claim 1 further comprising a trunion shaft having a groove, the poppet push pin riding on the trunion shaft.

3. The shift controlled bypass orifice of claim 1 further comprising a spring to bypass the bleed poppet.

4. The shift controlled bypass orifice of claim 1 wherein the bleed poppet is transverse to the bypass orifice.

5. The shift controlled bypass orifice of claim 1 further including a bleed passage through the bleed poppet.

6. A shift controlled bypass orifice for a hydrostatic transmission, comprising:
   a charge pump providing hydraulic fluid to a plurality of high pressure ports, each high pressure port having a charge system bypass valve;
   a bypass orifice connecting to each charge system bypass valve;
   a poppet valve closing the bypass orifice in response to the hydrostatic transmission moving to a non-neutral position; and
   a trunion shaft camming the poppet to close the bypass orifice in response to movement of an operator control to a non-neutral position.

7. The shift controlled bypass orifice of claim 6 further comprising an operator control connected to the trunion shaft, the operator control turning the trunion shaft between a neutral position, a forward position, and a reverse position.

8. The shift controlled bypass orifice of claim 6 further comprising a spring biasing the poppet valve to open the bypass orifice.

9. The shift controlled bypass orifice of claim 6 wherein the bypass orifice is transverse to the high pressure ports.

10. A shift controlled bypass orifice for a hydrostatic transmission, comprising:
    a charge pump providing hydraulic fluid to a plurality of high pressure ports, each high pressure port having a charge system bypass valve;
    a bypass orifice connecting to each charge system bypass valve;
    a poppet valve closing the bypass orifice in response to the hydrostatic transmission moving to a non-neutral position; and
    a bleed passage through the poppet valve.

11. A shift controlled bypass orifice for a hydrostatic transmission, comprising:
    a bypass orifice extending through a pump valve body of the hydrostatic transmission;
    an operator control attached to a trunion shaft having an outer surface, the operator control pivoting to move the hydrostatic transmission between a neutral position, a forward position, and a reverse position; and
    a poppet valve transverse to the bypass orifice, the poppet valve opening the bypass orifice further as the operator controls are pivoted further toward the neutral position, the poppet valve closing the bypass orifice further as the operator control is pivoted further toward the forward or reverse positions; and
    a poppet push pin riding on the outer surface of the trunion shaft.

12. The shift controlled bypass orifice of claim 11 wherein the operator control is a pivoting stick.

13. The shift controlled bypass orifice of claim 11 wherein the trunion shaft has a cylindrical outer surface with an axial groove.

14. The shift controlled bypass orifice of claim 11 wherein the hydrostatic transmission is a dual hydrostatic transmission.

15. A shift controlled bypass orifice for a hydrostatic transmission, comprising:
    a bypass orifice extending through a pump valve body of the hydrostatic transmission;
    an operator control pivoting to move the hydrostatic transmission between a neutral position, a forward position, and a reverse position; and
    a poppet valve transverse to the bypass orifice, the poppet valve opening the bypass orifice further as the operator control is pivoted further toward the neutral position, the poppet valve closing the bypass orifice further as the operator control is pivoted further toward the forward or reverse positions; and
    a poppet cap, and a spring between the poppet cap and the poppet valve.

16. A shift controlled bypass orifice for a hydrostatic transmission, comprising:
    a bypass orifice extending through a pump valve body of the hydrostatic transmission;
    an operator control pivoting to move the hydrostatic transmission between a neutral position, a forward position, and a reverse position; and
    a poppet valve transverse to the bypass orifice, the poppet valve opening the bypass orifice further as the operator control is pivoted further toward the neutral position, the poppet valve closing the bypass orifice further as the operator control is pivoted further toward the forward or reverse positions; and
    a bleed passage through the poppet valve.

* * * * *